(12) United States Patent
Kantor

(10) Patent No.: US 9,027,514 B2
(45) Date of Patent: May 12, 2015

(54) ARTICLE OF MANUFACTURE FOR STRETCHABLE NIGHT VISIBILITY BANDS FOR PEOPLE AND ANIMALS

(71) Applicant: Barbara Kantor, Boulder, CO (US)

(72) Inventor: Barbara Kantor, Boulder, CO (US)

( * ) Notice: Subject to any disclaimer, the term of this patent is extended or adjusted under 35 U.S.C. 154(b) by 274 days.

(21) Appl. No.: 13/646,691

(22) Filed: Oct. 6, 2012

(65) Prior Publication Data

US 2014/0096724 A1    Apr. 10, 2014

(51) Int. Cl.
*A01K 29/00* (2006.01)
*A41D 13/01* (2006.01)
*A01K 27/00* (2006.01)
*A01K 11/00* (2006.01)
*A41D 13/08* (2006.01)

(52) U.S. Cl.
CPC .............. *A41D 13/01* (2013.01); *A01K 27/001* (2013.01); *A41D 13/08* (2013.01); *A01K 11/00* (2013.01); *A01K 27/006* (2013.01)

(58) Field of Classification Search
CPC ..... A01K 27/006; A41D 13/01; A41D 20/00; A41D 31/0088; A41D 13/0562; A41D 2300/32; A42B 1/242; Y10S 2/11; Y10S 2/912
USPC .......... 119/857, 856; 2/170, 2, 338, 311, 312, 2/410, 417, 162, 917, 912, 908, 920, 69, 2/16, 455, 70
See application file for complete search history.

(56) References Cited

U.S. PATENT DOCUMENTS

| | | | | |
|---|---|---|---|---|
| 4,384,548 A * | 5/1983 | Cohn | ........................... | 359/518 |
| 4,517,685 A * | 5/1985 | Lesley | ........................... | 359/518 |
| 4,998,544 A * | 3/1991 | Obergfell | ........................... | 132/212 |
| 5,102,024 A * | 4/1992 | Boersma et al. | ........................... | 224/181 |
| 5,624,065 A * | 4/1997 | Steffe | ........................... | 224/625 |
| 5,632,235 A * | 5/1997 | Larsen et al. | ........................... | 119/856 |
| 5,906,206 A * | 5/1999 | Shaw et al. | ........................... | 128/882 |
| 5,950,569 A * | 9/1999 | Perrulli | ........................... | 119/770 |
| 5,971,947 A * | 10/1999 | McNally et al. | ........................... | 602/62 |
| 6,077,242 A * | 6/2000 | Falk et al. | ........................... | 602/62 |
| 6,080,124 A * | 6/2000 | Falk et al. | ........................... | 602/26 |
| 6,807,680 B2 * | 10/2004 | Sloot | ........................... | 2/16 |
| 7,246,380 B2 * | 7/2007 | Gardner et al. | ........................... | 2/69 |
| 7,393,336 B2 * | 7/2008 | Sloot | ........................... | 602/60 |
| 7,617,615 B1 * | 11/2009 | Martorell et al. | ........................... | 33/759 |
| 8,109,241 B2 * | 2/2012 | Wrenwood Maloney et al. | ........................... | 119/850 |
| 8,567,350 B2 * | 10/2013 | Wrenwood Maloney et al. | ........................... | 119/850 |

* cited by examiner

*Primary Examiner* — Yvonne Abbott-Lewis

(57) ABSTRACT

An article of manufacture for stretchable night visibility bands for people and animals with a inner band consisting of a primarily stretchable material, an outer band consisting of a night visibility material, a way to attach the inner band to the outer band, a means to interchange said inner bands and said outer bands and a way to close the inner band around an object. A preferred embodiment includes further an outer band made of a night visibility material fabricated of least one of the following: a reflective, a florescent or a glow in the dark material and backed with a material such as VELCRO that attaches to the inner band, A preferred embodiment includes the element of inner band consisting of a stretchable material with a looped surface such as Velstretch™.

18 Claims, 5 Drawing Sheets

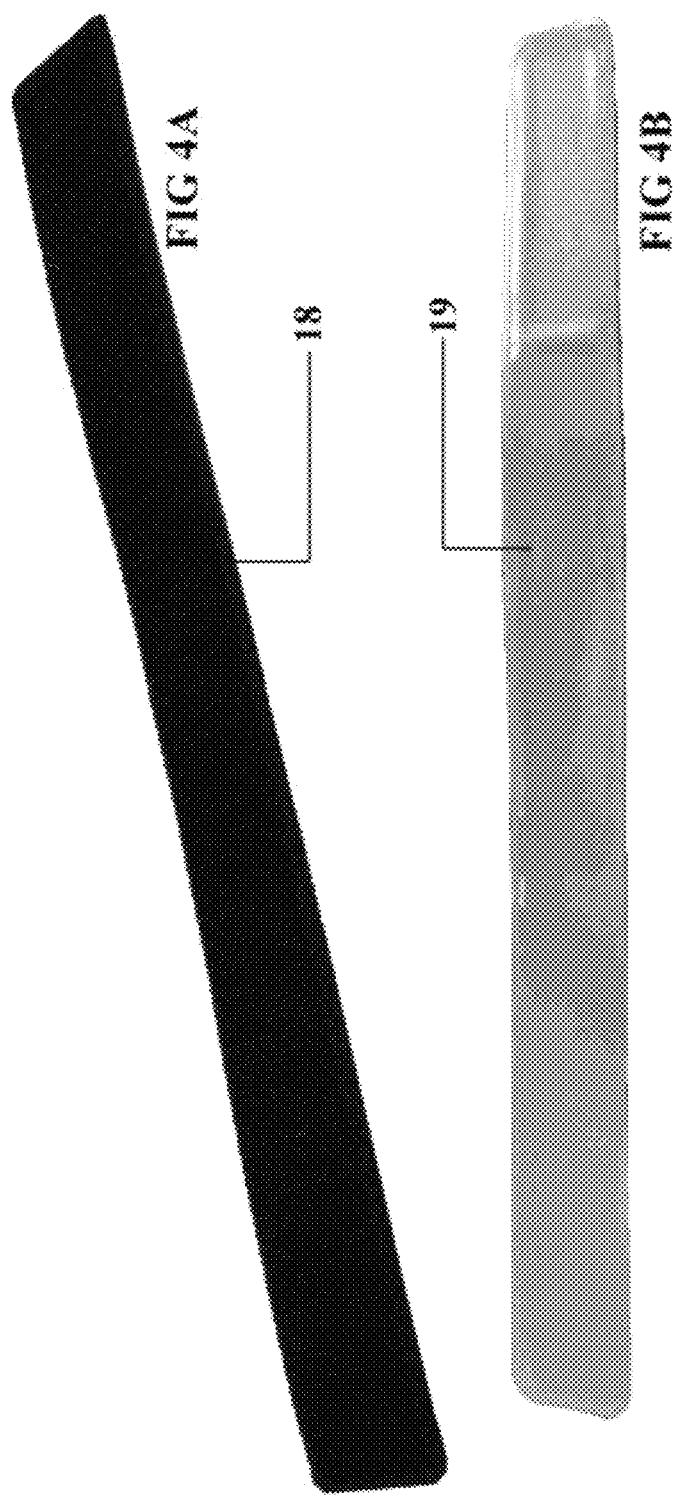

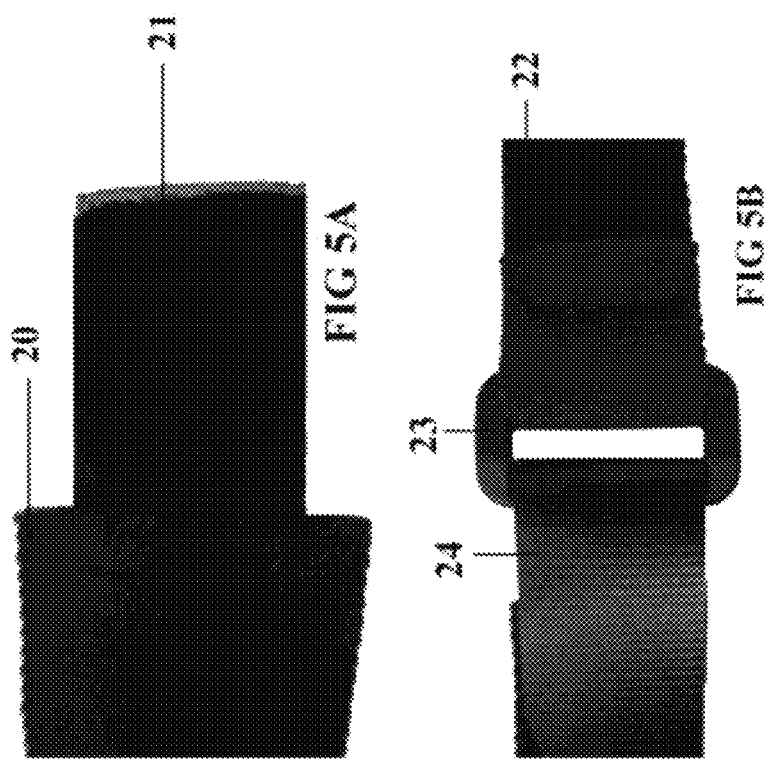

ARTICLE OF MANUFACTURE FOR STRETCHABLE NIGHT VISIBILITY BANDS FOR PEOPLE AND ANIMALS

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of bands and more specifically to an article of manufacture for stretchable night visibility bands for people and animals. Night visibility bands can be worn on any circumference and allow the wearer to be seen at night and prevent injuries and deaths of the wearer by allowing them to be visible in a dark environment. They are also used for identification at times, such as job role. In some instances, these bands are used primarily for identification or other functions such as decoration and are not highly visible at night. Common complaints are that they do not fit correctly, fall off or cannot be worn due to poor fit and are uncomfortable.

These bands can be utilized in a multitude of ways such as on a person or animals arm, leg, head, waist or inanimate object. They can even be attached to non-human circumferences such as the bars of a bicycle, purse handles and baby carriages.

Prior patents include, U.S. Pat. No. 5,865,148 by Aguirre and Mustari has interchangeable parts and is meant for use on animals, U.S. Pat. No. 5,970,526 by Weathers is an adjustable sized belt and U.S. Pat. No. 6,807,680 by Sloot which consisted an adjustable band and can be worn by people or animals and can utilize night visibility materials on the outer most layer.

This invention has improvements upon U.S. Pat. No. 5,865,148 by Aguirre and Mustari which include but are not limited to these features: stretchable, comfortable, designed for night visibly, designed to be used by both people and pets.

This invention has improvements upon U.S. Pat. No. 5,970,526 by Weathers which include but are not limited to these features: provides night visibilities, superior comfort and superior size adaptability.

This invention has improvements upon U.S. Pat. No. 6,807,680 by Sloot which include but are not limited to these features: inner band consists of a stretchable material with a looped surface, superior reduction of slipage of outerband relative to inner band during movement, no strap needed to attach outer layer, less complicated, less expensive to produce due to less complexity, superior comfort and superior size adaptability, does not cause resistance during movement.

BRIEF SUMMARY OF THE INVENTION

The primary object of the invention is to provide a night visibility band that is comfortable.

Another object of the invention is to provide a night visibility band that adapts to many size requirements.

Another object of the invention is to provide a night visibility band that stretches.

Another object of the invention is to provide a night visibility band that is inexpensive to produce.

Another object of the invention is to provide a night visibility band that stays in place.

Another object of the invention is to provide a night visibility band that can be utilized for both people and animals.

A further object of the invention is to provide a night visibility band that can easily be put on or removed.

Yet another object of the invention is to provide a night visibility band with interchangeable parts.

Still yet another object of the invention is to provide a night visibility band with replaceable parts.

Another object of the invention is to provide a night visibility band that can be used for identification functions such as job role.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an article of manufacture for stretchable night visibility bands for people and animals comprising: A inner band consisting of a stretchable material with a looped surface, a outer band consisting of a night visibility material, a means to attach said inner band to said outer band, and a means to close said inner band around an object.

In accordance with a preferred embodiment of the invention, there is disclosed an article of manufacture for stretchable night visibility bands for people and animals comprising: a inner band consisting of a stretchable material with a looped surface like Velstretch™, a outer band consisting of a night visibility material such as reflective, florescent or glow in the dark material and backed with a material that attaches to inner band, a means to attach said inner band to said outer band such as VELCRO or snaps, and a means to close said inner band around an object.

In accordance with a preferred embodiment of the invention, there is disclosed an article of manufacture for stretchable night visibility bands for people and animals comprising: a inner band consisting of a stretchable material with a looped surface, a outer band consisting of a night visibility material, a means to attach said inner band to said outer band, a means to interchange said inner bands and said outer bands, and a means to close said inner band around an object.

Upon first use the stretchable inner band is placed onto the desired circumference, stretching it slightly for secure and comfortable fit. It can then be securely closed around the desired circumference or is alternatively already in a closed circle depending on method of closure. The outer night visibility band is then attached to the inner band. The inner stretchable band, still attached to outer night visibility band is removed after use. Future uses provide an accurate and comfortable fit. The outer and inner bands are interchangeable since the outer band can be easily removed and replaced with a different outer band.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 4A is a photo of a preferred embodiment of the back side of the outer band which is backed with VELCRO hook.

FIG. 4B is a photo of a preferred embodiment of the top side of the outer band made of reflective material.

FIG. 5A is a photo of a preferred embodiment of the closure consisting of VELCRO hook attached to the end of the inner band.

FIG. 5B is a photo of a preferred embodiment of the closure consisting of VELCRO hook looping through an O ring.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The invention is an article of manufacture for stretchable night visibility bands for people and animals comprising: A inner band consisting of a primarily stretchable material; A outer band consisting of a night visibility material; A means to attach inner band to outer band; A means to interchange inner bands and outer bands; and a means to close inner band around an object such as a leg, arm, neck, head, waist or inanimate object.

Figure 1:
FIG. 1 is a photo of the invention showing how the inner and outer bands attach and detach.

Referring to FIG. 1—Upon first use the stretchable inner band 12 is placed onto the desired circumference, stretching it slightly for secure and comfortable fit. It can then be securely closed around the desired circumference or is alternatively already in a closed circle depending on method of closure 11. The outer night visibility band 10 is then attached to the inner band. The inner stretchable band, still attached to outer night visibility band is removed after use. Future uses provide an accurate and comfortable fit. The outer and inner bands are interchangeable since the outer band can be easily removed and replaced with a different outer band.

Figure 2:
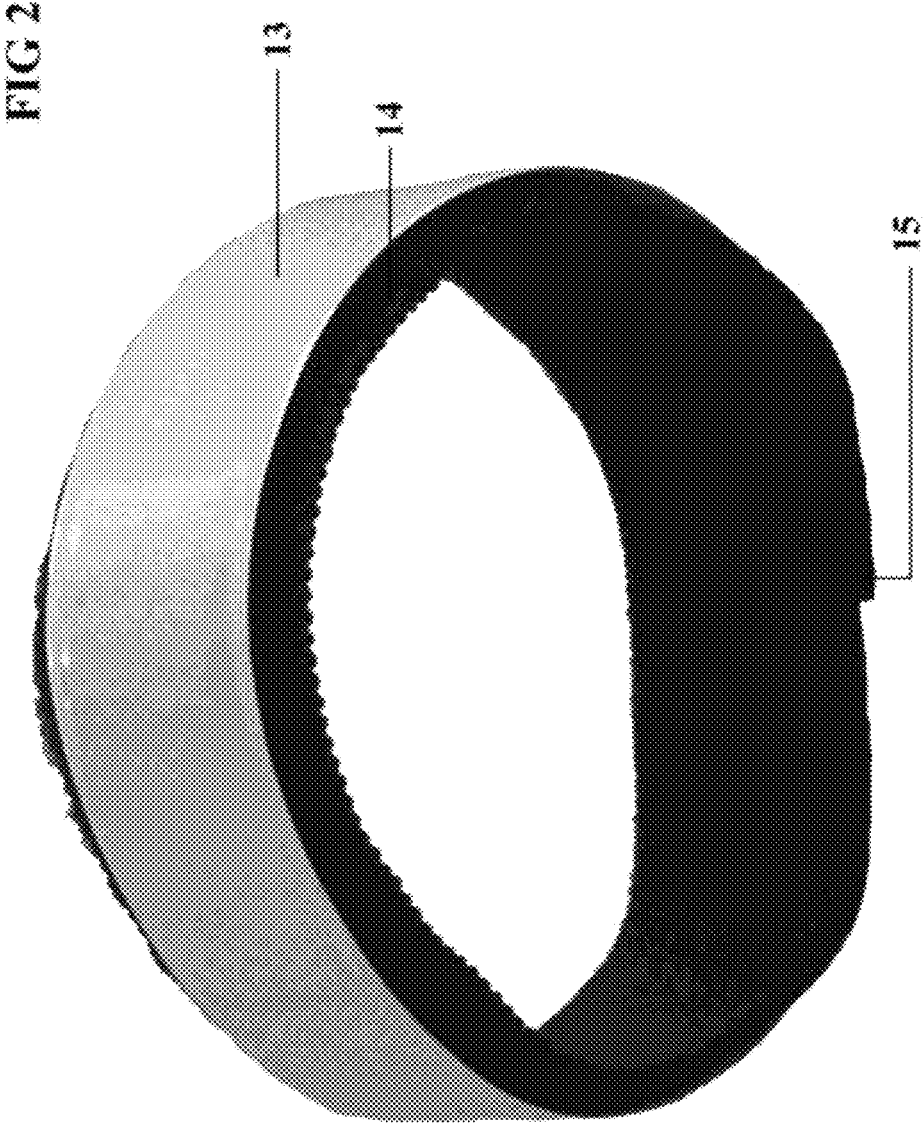
FIG. 2 is a photo of the invention fully assembled and in the closed position.

Referring to FIG. 2—The photo shows the invention fully assembled and in the closed position. A preferred embodiment of the invention, an article of manufacture for stretchable night visibility bands for people and animals comprising: a inner band 14 consisting of a primarily stretchable material with a looped surface like Velstretch™, a outer band consisting of a night visibility material such as reflective 13, florescent or glow in the dark material and backed with a material that attaches to inner band, a means to attach inner band 14 to outer band 13 such as with VELCRO hook or snaps, and a means to close 15 inner band around an object such as a leg, arm, neck, head, waist or inanimate object.

Figure 3:
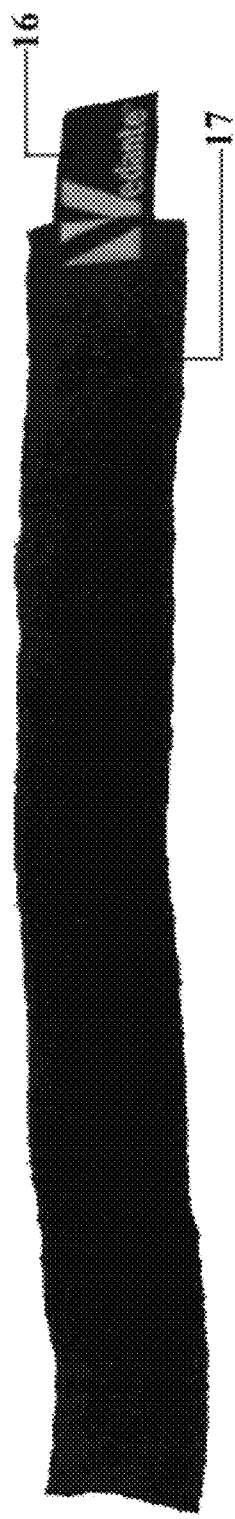
FIG. 3 is a photo of the invention showing a preferred version of the inner band made of a stretchable material with a looped surface and has a logo imprinted VELCRO hook closure.

Referring to FIG. 3—a photo of the invention showing a preferred version of the inner band 17 made of stretchable material with a looped surface and has a logo imprinted VELCRO hook closure 16. Although not shown in FIG. 3, inner band can be varied by use of different colors of primarily stretchable material with a looped surface, different shapes of said primarily stretchable material with a looped surface, different graphics on said primarily stretchable material with a looped surface, different lettering on said primarily stretchable material with a looped surface, varying ratio of stretchable materials with a looped surface, to said non-stretchable materials which compromise primarily stretchable material with a looped surface, different colors of non-stretchable materials, different shapes of non-stretchable material, different graphics on non-stretchable material, different lettering on non-stretchable material, vary length of said inner band, vary width of inner band, vary exterior perimeter shape of inner band or vary edge shape of inner band. Even though non-reflective materials do not create superior night visibility, many are superior for identification and decorative purposes.

FIG. 4A—is a photo of a preferred embodiment of the back side of the outer band 18 which is backed with VELCRO hook. Amongst many other means of connection of the outer band to inner band, not shown in FIG. 4A, snaps are preferable. The ability to easily attach and detach inner bands to outer bands creates the ability to interchange and\or replace different outer and inner bands with each other.

FIG. 4B—is a photo of a preferred embodiment of the top side of the outer band made of reflective material 19. Although not shown in FIG. 4B, the outer band can consist of many other types of night visibility materials including, but not limited to, florescent and glow in the dark materials. The outer layer of the outer band can be varied in a mulitite of way. Some include the use of different colors of night visibility materials, different shapes of night visibility materials, different graphics on night visibility materials, different lettering on night visibility materials, vary length of said outer band, vary width of said outer band, vary exterior perimeter shape of said outer band or vary edge shape of said outer band. Additionally the outer layer can be varied by the use on non-reflective materials.

FIG. 5—the photo exhibits preferred embodiments of the means to close inner band.

FIG. 5A is a photo of a preferred embodiment of the closure consisting of VELCRO hook 21 attached to the inner band 20. FIG. 5B is a photo of a preferred embodiment of the closure consisting of VELCRO hook 24 looping through an O ring 23 which is attached to the inner band 22. Although not shown in FIG. 5, many alternate means of closing the inner band exist. They include, but are not limited to, circular knitting melting, gluing or weaving of said inner band, or addition of element such as VELCRO, snaps, Buckle, and D Rings.

The invention—an article of manufacture for stretchable night visibility bands for people and animals with a inner band consisting of a primarily stretchable material with a looped surface, an outer band consisting of a night visibility material, a way to attach the inner band to the outer band, a means to interchange said inner bands and said outer bands and a way to close the inner band around an object provides superior comfort, adapts to many size requirements, stretches, is inexpensive to produce, stays in place, can be utilized for both people and animals, can easily be put on or removed, provides interchangeable and replaceable parts and can be used for identification functions such as job role or for decoration.

A preferred embodiment includes an outer band made of a night visibility material such as a reflective, a florescent or a glow in the dark material and backed with a material such as VELCRO hook that attaches to the inner band, A preferred embodiment includes the element of inner band consisting of a stretchable soft-material with a looped surface such as Velstretch™.

This invention has been described in a particular arrangement of parts, features and possible variations. These are not intended to exhaust all possibilities. There are many other modifications and variations possible that will be discernable by those of skill in the art.

What is claimed is:

1. An article of manufacture for stretchable night visibility bands for people and animals comprising:
    An inner band consisting substantially of a stretchable material with a looped surface such as Velstretch™;
    An outer band consisting of a night visibility material;
    A means to attach said inner band to said outer band; and
    A means to close said inner band around an object.

2. An article of manufacture for stretchable night visibility bands for people and animals as claimed in claim 1 further comprising of said outer band made of a night visibility material fabricated of at least one of the following: a reflective, a florescent or a glow in the dark material and backed with a material that attaches to said inner band.

3. An article of manufacture for stretchable night visibility bands for people and animals as claimed in claim 2 in which outer layer can be varied by use of different colors of night visibility materials, different shapes of night visibility materials, different graphics on night visibility materials, different lettering on night visibility materials, vary length of said outer band, vary width of said outer band, vary exterior perimeter shape of said outer band or vary edge shape of said outer band and by the use of non-reflective materials.

4. An article of manufacture for stretchable night visibility bands for people and animals as claimed in claim 1 further comprising a means to attach said inner band to said outer band such as VELCRO or snaps.

5. An article of manufacture for stretchable night visibility bands for people and animals as claimed in claim 1 wherein said [element] closure of said inner band consists of a process comprised of at least one of the following: circular knitting melting, gluing or weaving of said inner band, or addition of closure element like VELCRO, snaps, Buckle, D Ring, O Ring.

6. An article of manufacture for stretchable night visibility bands for people and animals as claimed in claim 1 wherein said [element] of said inner band can be varied by use of different colors of said primarily stretchable material, different shapes of said primarily stretchable material, different graphics on said primarily stretchable material, different lettering on said primarily stretchable material, varying ratio of stretchable materials to said non-stretchable materials which compromise said primarily stretchable material, different colors of said non-stretchable materials, different shapes of said non-stretchable material, different graphics on said non-stretchable material, different lettering on said non-stretchable material, vary length of said inner band, vary width of said inner band, vary exterior perimeter shape of said inner band or vary edge shape of said inner band.

7. An article of manufacture for stretchable night visibility bands for people and animals comprising:
    An inner band consisting substantially of a stretchable material with a looped surface like Velstretch™;
    An outer band consisting of a night visibility material comprised of at least one of the following: reflective, florescent or glow in the dark material and backed with a material that attaches to inner band;
    A means to attach said inner band to said outer band such as VELCRO or snaps; and
    A means to close said inner band around an object.

8. An article of manufacture for stretchable night visibility bands for people and animals as claimed in claim 7 wherein said [element] closure of said inner band consists of a process comprised of at least one of the following: circular knitting melting, gluing or weaving of said inner band, or addition of closure element like VELCRO, snaps, Buckle, D Ring, O Ring.

9. An article of manufacture for stretchable night visibility bands for people and animals as claimed in claim 7 in which outer layer can be varied by use of different colors of night visibility materials, different shapes of night visibility materials, different graphics on night visibility materials, different lettering on night visibility materials, vary length of said outer band, vary width of said outer band, vary exterior perimeter shape of said outer band or vary edge shape of said outer band and by the use of non-reflective materials.

10. An article of manufacture for stretchable night visibility bands for people and animals as claimed in claim 7 wherein said [element] of said inner band can be varied by use of different colors of said stretchable material, different shapes of said stretchable material, different graphics on said stretchable material, different lettering on said stretchable material, vary length of said inner band, vary width of said inner band, vary exterior perimeter shape of said inner band or vary edge shape of said inner band.

11. An article of manufacture for stretchable night visibility bands for people and animals comprising:
    An inner band consisting substantially of a stretchable material with a looped surface such as Velstretch™;
    An outer band consisting of a night visibility material;
    A means to attach said inner band to said outer band;
    A means to interchange said inner bands and said outer bands; and
    A means to close said inner band around an object.

12. An article of manufacture for stretchable night visibility bands for people and animals as claimed in claim 11 further comprising of said inner band of a stretchable material with a looped surface such as Velstretch™ or other stretchable material with a segment of a non-stretchable material backed with means of attaching said inner band to said outer band.

13. An article of manufacture for stretchable night visibility bands for people and animals as claimed in claim 11 further comprising of said outer band made of a night visibility material fabricated of at least one of the following: a reflective, a florescent or a glow in the dark material and backed with a material that attaches to said inner band.

14. An article of manufacture for stretchable night visibility bands for people and animals as claimed in claim 13 in which outer layer can be varied by use of different colors of night visibility materials, different shapes of night visibility materials, different graphics on night visibility materials, different lettering on night visibility materials, vary length of said outer band, vary width of said outer band, vary exterior perimeter shape of said outer band or vary edge shape of said outer band and by the use of non-reflective materials.

15. An article of manufacture for stretchable night visibility bands for people and animals as claimed in claim 11 further comprising of a means to attach said inner band to said outer band such as VELCRO or snaps.

16. An article of manufacture for stretchable night visibility bands for people and animals as claimed in claim 11 further comprising a means to interchange said inner bands and said outer bands such as VELCRO or snaps on the outer most side of said inner bands and the inner most side of said out band.

17. An article of manufacture for stretchable night visibility bands for people and animals as claimed in claim 11 wherein said [element] closure of said inner band consists of a process comprised of at least one of the following: circular knitting melting, gluing or weaving of said inner band, or addition of a closure element like VELCRO, snaps, Buckle, D Ring, O Ring.

18. An article of manufacture for stretchable night visibility bands for people and animals as claimed in claim 11 wherein said [element] of said inner band can be varied by use of different colors of said primarily stretchable material with a looped surface, different shapes of said primarily stretchable material with a looped surface, different graphics on said primarily stretchable material with a looped surface, different lettering on said primarily stretchable material with a looped surface, varying ratio of stretchable materials with a looped surface, to said non-stretchable materials which compromise said primarily stretchable material with a looped surface, different colors of said non-stretchable materials, different shapes of said non-stretchable material, different graphics on said non-stretchable material, different lettering on said non-stretchable material, vary length of said inner band, vary width of said inner band, vary exterior perimeter shape of said inner band or vary edge shape of said inner band.

* * * * *